United States Patent
Kseizopolski

(10) Patent No.: US 9,951,874 B2
(45) Date of Patent: Apr. 24, 2018

(54) SLIDE OUT SEAL WITH BOX TUNNEL

(71) Applicant: LIFETIME INDUSTRIES, INC., Modesto, CA (US)

(72) Inventor: Edwin E Kseizopolski, Granger, IN (US)

(73) Assignee: Lifetime Industries, Inc., Modesto, CA (US)

( * ) Notice: Subject to any disclaimer, the term of this patent is extended or adjusted under 35 U.S.C. 154(b) by 441 days.

(21) Appl. No.: 14/672,660

(22) Filed: Mar. 30, 2015

(65) Prior Publication Data

US 2015/0291236 A1    Oct. 15, 2015

Related U.S. Application Data

(60) Provisional application No. 61/977,874, filed on Apr. 10, 2014.

(51) Int. Cl.

| F16J 15/02 | (2006.01) |
|---|---|
| B60P 3/34 | (2006.01) |
| B60J 10/00 | (2016.01) |
| B60R 13/06 | (2006.01) |
| F16J 15/50 | (2006.01) |
| B60J 10/24 | (2016.01) |

(52) U.S. Cl.
CPC .......... *F16J 15/50* (2013.01); *B60P 3/34* (2013.01); *F16J 15/027* (2013.01); *B60J 10/24* (2016.02); *B60R 13/06* (2013.01)

(58) Field of Classification Search
CPC .... B60P 3/34; B60P 3/341; B60J 10/24; B60J 10/246; F16J 15/022; F16J 15/025; F16J 15/027

See application file for complete search history.

(56) References Cited

U.S. PATENT DOCUMENTS

| 5,785,373 | A | * | 7/1998 | Futrell | B60P 3/34 296/165 |
|---|---|---|---|---|---|
| 8,408,625 | B1 | * | 4/2013 | Ksiezopolski | B60P 3/34 296/171 |
| 8,910,422 | B2 | * | 12/2014 | Siegel | B60P 3/32 277/649 |
| 9,033,390 | B1 | * | 5/2015 | Ksiezopolski | B60R 13/06 296/26.13 |
| D741,231 | S | * | 10/2015 | Schoonover | D12/106 |
| 2008/0048464 | A1 | * | 2/2008 | Ksiezopolski | B60P 3/34 296/26.01 |
| 2008/0073925 | A1 | * | 3/2008 | Ksiezopolski | B60P 3/34 296/26.01 |
| 2008/0116707 | A1 | * | 5/2008 | Boaz | B60P 3/34 296/26.01 |
| 2012/0079771 | A1 | * | 4/2012 | Meulemans | E06B 7/2305 49/484.1 |

(Continued)

*Primary Examiner* — Nicholas L Foster
(74) *Attorney, Agent, or Firm* — Botkin & Hall, LLP

(57) ABSTRACT

A resilient seal for mobile living quarters around a slide out room that includes a pair of mounting portions extending along the inside and outside surfaces of the main living area wall at an aperture through which the slide out room moves and further includes a connecting member extending between the attaching members and along the edge of the wall defining the aperture. A wiper seal extends from the connecting member to flex against the walls of the slide out room, and a cavity is formed between the seal and the aperture to allow room to route wires.

18 Claims, 6 Drawing Sheets

(56) References Cited

U.S. PATENT DOCUMENTS

| | | | |
|---|---|---|---|
| 2013/0269262 A1* | 10/2013 | Siegel | B60R 13/08 |
| | | | 49/492.1 |
| 2014/0001710 A1* | 1/2014 | Siegel | B60R 13/06 |
| | | | 277/630 |
| 2014/0097578 A1* | 4/2014 | Young | F16J 15/027 |
| | | | 277/628 |
| 2015/0260287 A1* | 9/2015 | Young | F16J 15/027 |
| | | | 277/312 |
| 2016/0003358 A1* | 1/2016 | Young | F16J 15/027 |
| | | | 277/645 |
| 2016/0201893 A1* | 7/2016 | Ksiezopolski | F21V 33/006 |
| | | | 362/311.02 |
| 2016/0207438 A1* | 7/2016 | Ksiezopolski | B60P 3/36 |

* cited by examiner

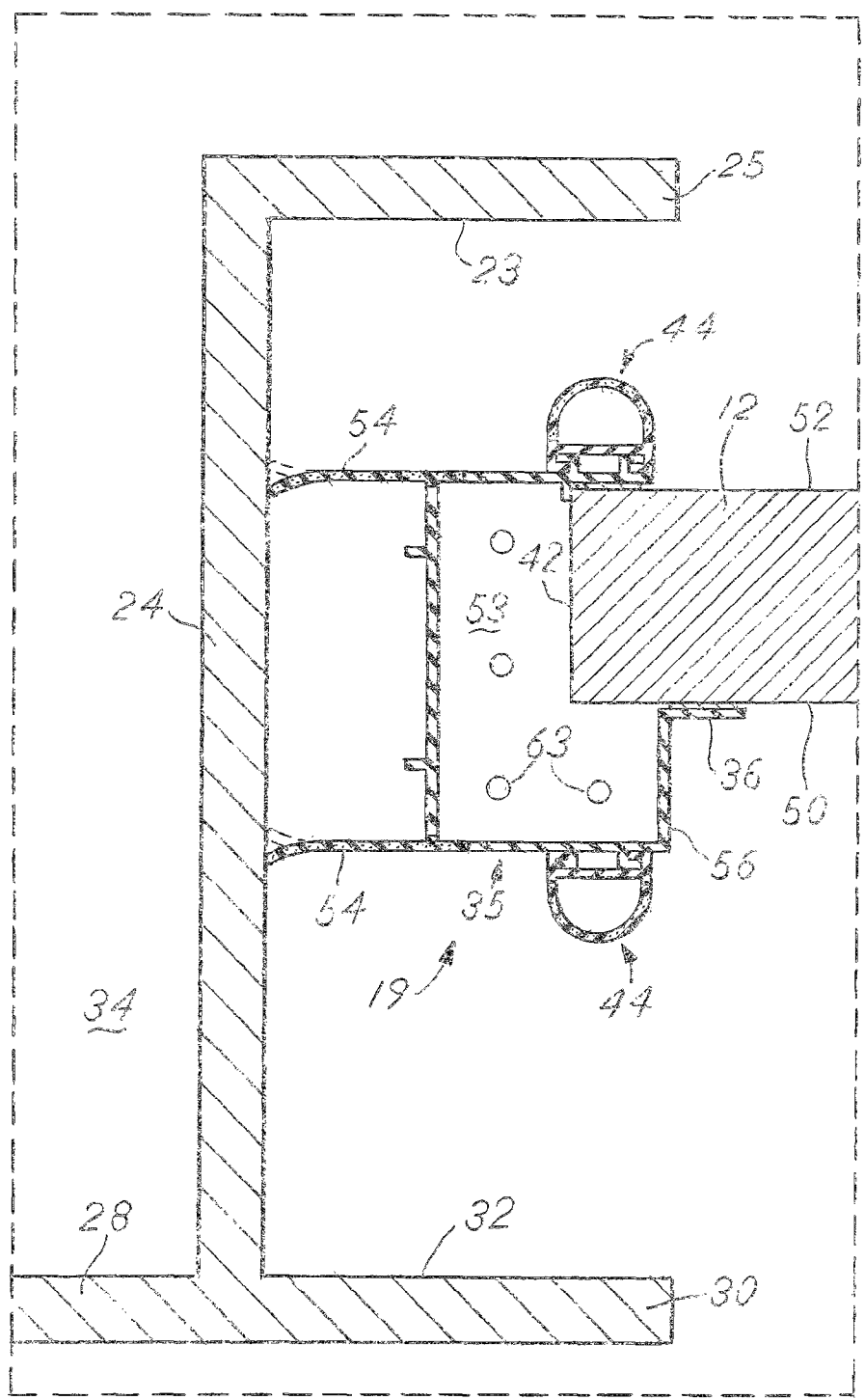

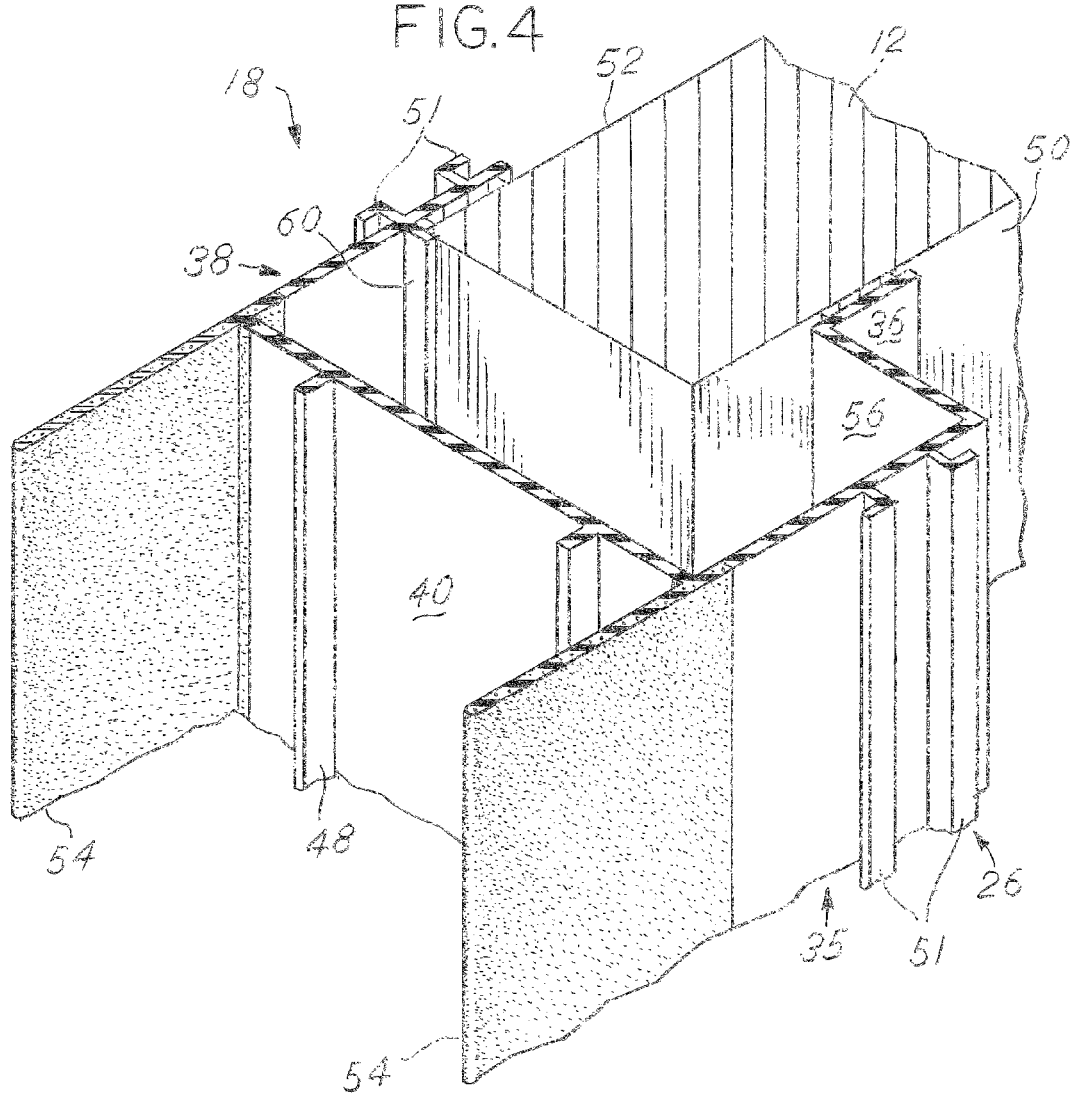

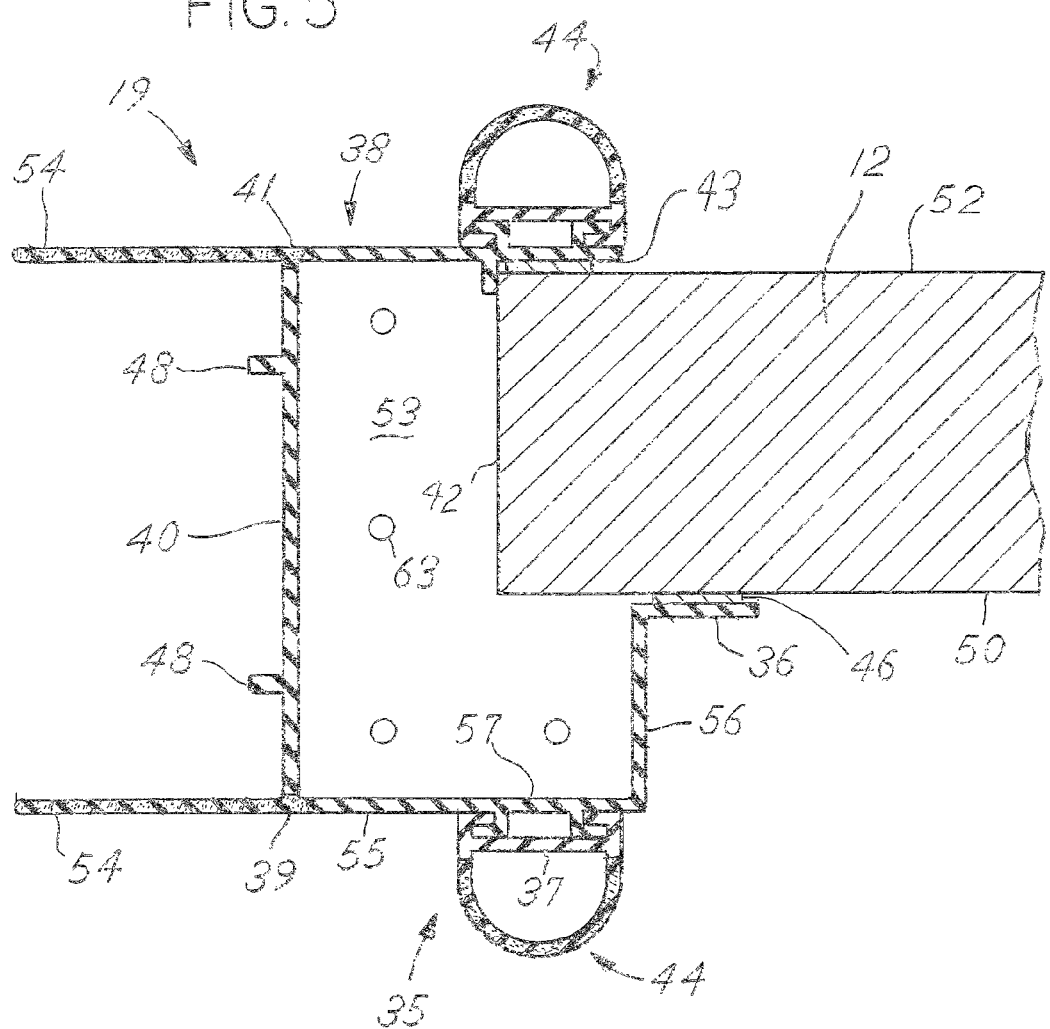

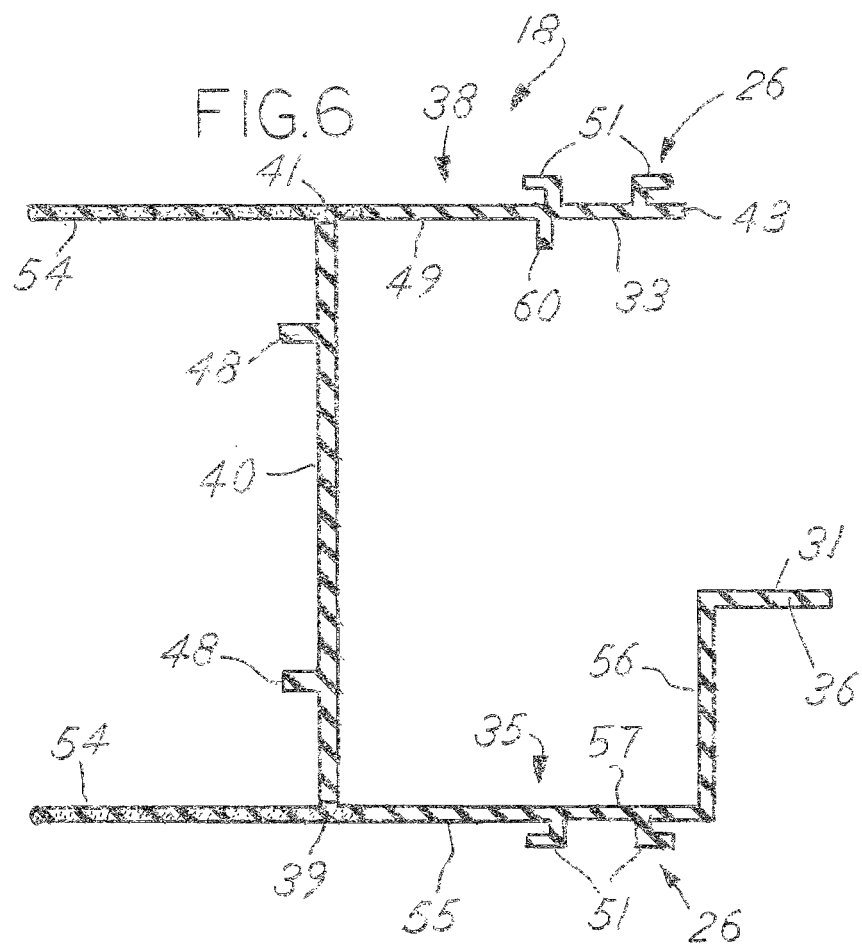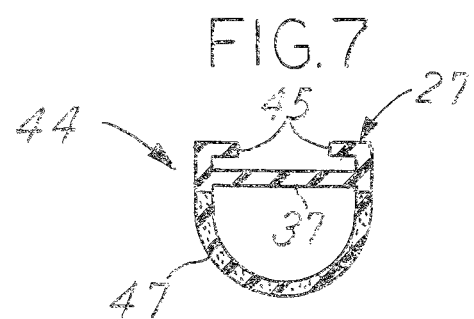

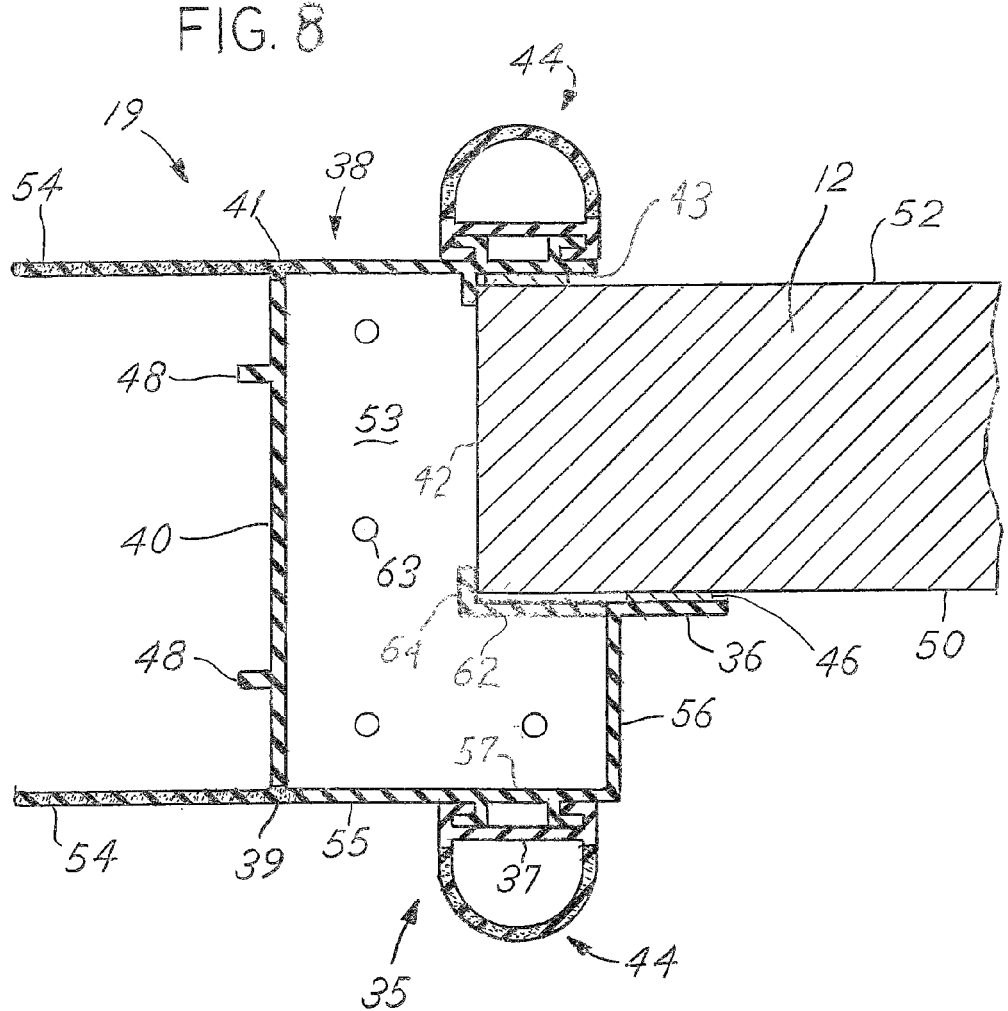

SLIDE OUT SEAL WITH BOX TUNNEL

CROSS REFERENCE TO RELATED APPLICATIONS

This application claims the benefit of U.S. Provisional Application No. 61/977,874, filed Apr. 10, 2014, the disclosures of which are hereby incorporated by reference.

BACKGROUND OF THE INVENTION

Recreational vehicles such as motor homes and travel trailers are commonly equipped with one or more slide out rooms that are retracted within the main living quarters when the unit is transported, but can be extended from the main living quarters to provide auxiliary space when the unit is parked. Commonly, bulb seals extend around the aperture defined in the outside of the sidewall of the main living quarters through which the slide out room extends and retracts. This seal is engaged by a first flange on the exterior side of the slide out room to seal the gap between the slide out room and the main living quarters when the slide out room is retracted. Similarly, a second bulb seal extends around the aperture on the inside of the sidewall and is engaged by a second flange on the interior side of the slide out room when the slide out room is extended for use. Wiper seals are mounted on sidewalls adjacent to the aperture and are flexed against corresponding walls of the slide out room. The bulb seals seal the slide out room in the extended and retracted positions, and the wiper seal wipes against the slide out room as it is extended and retracted to prevent moisture and debris from entering the vehicle. While the seals of the aforementioned patents accomplished their task successfully, there are issues when wires or hoses need to be routed around the opening in the sidewall. An improved seal is desired.

SUMMARY OF THE INVENTION

According to the invention, a resilient seal for mobile living quarters is provided for sealing around a slide out room of mobile living quarters having an aperture slidably receiving a slide out room. The resilient seal has a pair of attaching members extending along the inside and outside surfaces of the main living area wall at the aperture and further include a connecting member extending between the attaching members and set apart from the edge of the wall defining the aperture. A cavity is created between the sidewall of the living quarters and the seal such that apparatus, wires, or hoses can be routed without disturbing the seal or slide out room.

BRIEF DESCRIPTION OF THE DRAWINGS

FIG. 3 is a partial section view 3 of the trailer in FIG. 2;
FIG. 4 is a isometric view of the seal structure installed on a sidewall;
FIG. 5 is a top section view of the seal structure in FIG. 3;
FIG. 6 is a top section view of the seal structure in FIG. 4;
FIG. 7 is a top section view of the bulb seal;
and
FIG. 8 is a top section view of the seal having a second stop.

DETAILED DESCRIPTION OF INVENTION

Figure 1:
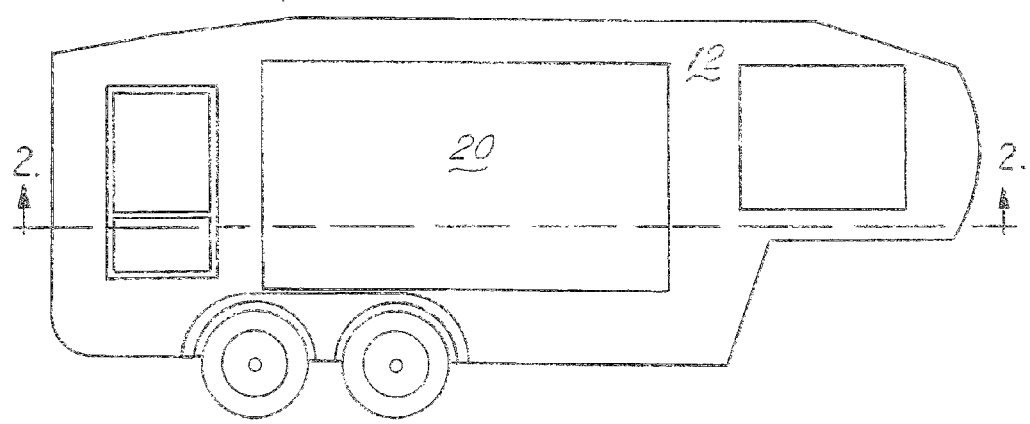
FIG. 1 is a side view of the trailer.
Figure 2:
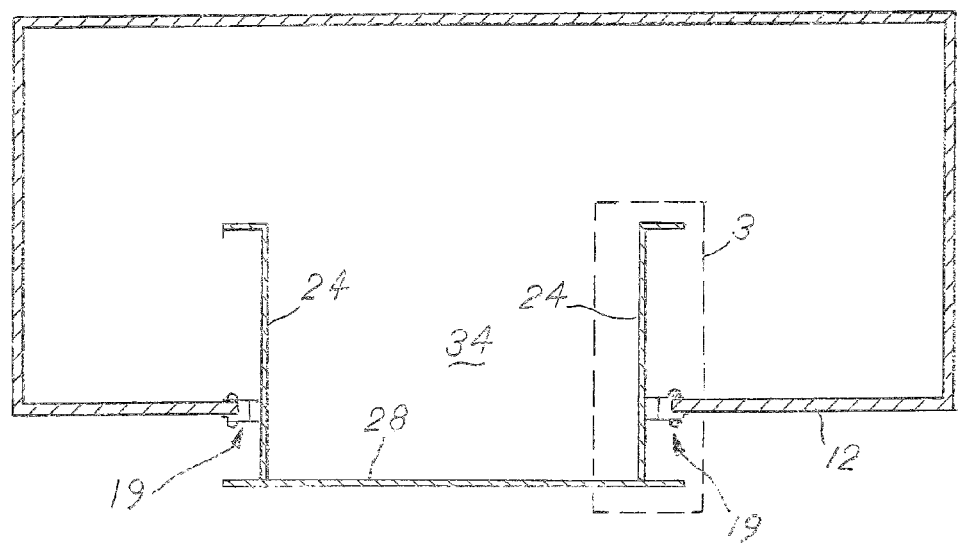
FIG. 2 is a section view 2-2 of the trailer in FIG. 1.

Referring now to the drawings, mobile living quarters, such as the trailer generally indicated at 10 in FIG. 1, includes side walls 12 and a ceiling wall 14. The mobile living quarters shown in FIGS. 1 & 2 is a trailer, but can apply to recreational vehicles or other spaces where a movable section is desired. The mobile living quarters 10 is mounted on wheels 16 for transport. An aperture is provided in one of the side walls 12 and slidably receives a slide out room 20 as shown in FIG. 2. This is best seen in the magnified view shown in FIG. 3. The side walls 12 and ceiling wall 14 cooperate to define a main living area. The slide out room 20 includes side walls 24, a ceiling wall, and a front wall 28. As known to those skilled in the art, the slide out room 20 is mounted for movement through the aperture, so that it may be retracted into the main living quarters 22 as is shown in FIG. 1. FIG. 2 shows the slide out room 20 in an intermediate position between a retracted position and an extended position. When the unit is transported, but can be extended from the main living quarters when the unit is parked, thereby providing auxiliary living space. The slide out room 20 includes an exterior flange 30 extending around the side walls 24 and ceiling wall. The exterior flange 30 has an inside surface 32 designed to mate with a seal assembly 19. The slide out room 20 includes another flange, being an interior flange 25, extending around the side walls 24 and ceiling wall at the ends thereof opposite the ends joined to the front wall 28. The side walls 24, ceiling wall, and front wall 28 cooperate to define an auxiliary living area 34 as shown in FIG. 2, which is available for use when the unit is parked and the slide out room 20 is moved to the extended position.

FIG. 4 shows the seal base 18 as it is assembled onto a sidewall 12. The seal base 18 has an inside mounting side 38 terminating at a bridge, hereinafter referred to as a connecting member 40 along one lateral edge. The inside mounting side 38 has a spacing wall 49 and a mounting portion 43. As shown, the spacing wall 49 and mounting portion 43 are inline. Located between the attachment flange and the spacing wall portion is a stop 60. An outside mounting side 35 terminates at the other lateral edge of the connecting member 40. Both mounting sides 35, 38 and connecting member 40 are made with a higher durometer material and connected to each other at lower durometer portions 39, 41. As installed to the sidewall 12 as shown in FIGS. 3 through 5, the longitudinal connecting member 40 extends substantially parallel to and separated from the transverse edge 42. The connecting member 40 includes ribs 48. The other side of the longitudinal connecting member 40 is connected to the outside mounting side 35 at a spacing wall 55. The spacing wall 55 is inline with a mounting portion 57. The spacing wall 55 and mounting portion 57 run substantially parallel to and is separated from the outside surface 50 of the sidewall 12. The outside mounting side 35 contains separating wall 56 and mounting flange 36 as shown in FIG. 6. The mounting flange 36 has a mounting surface 31 and the interior mounting side 38 has a corresponding mounting surface 33. Mounting surfaces 31, 33 are part of mounting flange 36 and mounting side 38. It is contemplated that the seal is reversed, such that inside mounting side 38 is attached to the outside and outside mounting side 35 is attached to the inside. As shown in FIG. 6, the inside mounting side 38 contains the stop 60 that is adjacent to an mounting surface 33. In FIGS. 4 and 5, a seal base 18 is installed around the aperture in the sidewall 12 such that stop 60 abuts the transverse edge 42 and inside mounting surface 33 overlays and contacts a portion the inside surface 52 of the sidewall 12. The stop 60 is spaced from connecting member 40, FIG. 6. A portion of the exterior mounting side 35 is offset from the mounting flange 36 by separating wall 56. When mounting sides 35, 38 are affixed to the sidewall 12, an interior cavity 53 is formed. The cavity 53 is bounded by sidewall 12, mounting sides 35, 38, and longitudinal connecting member 40. The interior cavity 53 can house wires 63, cables or hoses as shown in FIG. 3. The interior cavity 53 is visible in FIGS. 3 through 5. It is contemplated that the interior cavity 53 contains separating features to create separate cavities. The separate cavities can improve insulative properties or allow separate locations to run wires or hoses. It is further contemplated that separating wall 56 can have illumination for decorative or safety purposes.

The seal base 18 can include a second stop 64 that is connected to the mounting flange 36 by a stop wall 62. The second stop 64 contacts a portion of the transverse wall 42 to locate the mounting flange 36, mounting portion.

Mounting sides 35, 38 include oppositely extending, rail-like outwardly facing L-shaped tabs 51 which form a tongue 26. As shown in FIG. 6, the tongue 26 is located on the mounting portions 43 and 57. A bulb seal 44 includes L-shaped tabs 45 which form an inwardly facing groove 27 as shown in FIG. 5-7. When the mounting side 35, 38 and its respective bulb seal 44 are connected together, the tongue 26 fits into the groove 27 as is shown in FIG. 5. The L-shaped tabs 45 all extend lengthwise along the bulb seal 44 such that, once fitted together, the bulb seal 44 may be slid along the length of the mounting side 35, 38, and are flexible enough to allow them to snap past each other for assembly. It contemplates that the orientation of the tongue 26 and groove 27 can be reversed so that the tongue is on the bulb seal 44 and the groove is on corresponding mounting sides 35, 38. Alternatively, the clip part of the bulb seal portion may be slid into a mounting portion from an end of the seal. Preferably, the bulb seal 44 is constructed such that L-shaped tabs 45 are more rigid than a bulb portion 47. The bulb seals 44 have the bulb portion 47 that is arcuately shaped. The bulb portion 47 has a consistent thickness as is shown in FIG. 7. The bulb seal 44 has an internal web 37 that connects opposing sides of the bulb portion 47 and is adjacent to the tongue 27. The web 37 prevents the opposing sides of the bulb seal 44 from separating, especially when the bulb seal 44 is compressed against inside surfaces 23, 32.

It is necessary to assure that moisture, dirt, debris, etc. be prevented from entering the living quarters. Bulb seals 44 are subsequently added to the seal base 18 to form a seal assembly 19 as shown in FIG. 5. The seal assembly 19 must provide sealing at the extended position, refracted position, and all intermediate positions. Wiper seals 54 extend from the connecting portion 40 and are adapted to flex against the side walls 24 and ceiling wall of the slide out room 20 during extension and retraction of the latter. The wiper seals 54 are typically made from a lower durometer material to facilitate flexing and resilient sealing. As shown in FIG. 3, the seal assembly 19 includes bulb seals 44 mounted around the aperture on the exterior surface and the interior surface of the side wall 12. Adjacent the aperture, wiper seals 54 engage the side walls 24 and ceiling wall of the slide out room to wipe against the walls as the slide out room 20 extends and refracts. Preferably, the seal base 18 and bulb seals 44 are made continuously through an extrusion process and are consistent along their entire length, so that an appropriate length can be cut off and installed.

When the slide out room 20 is fully retracted, the bulb seal 44 that is attached to the exterior mounting flange 36 is compressed against the inside surface 32 of the exterior flange 30. The bulb seal 44 deforms as pressure is formed between the bulb portion 47 and the exterior flange 30. Correspondingly, when the slide out room 20 is fully extended, the bulb seal 44 that is attached to the interior mounting side 35 is compressed against the inside surface 23 of the interior flange 25. The bulb seal 44 deforms as pressure is formed between the bulb portion 47 and the corresponding flange 25, 30.

Screws can be driven through mounting flange 36 or interior mounting side 38 into the sidewall 12. The opposite side of the adhesive tape is covered by a protective removable coating that prevents it from sticking to anything. Optionally, the seal base 18 includes a strip of double sided adhesive tape 46 protected with a protective removable coating on the side that faces the side wall 12. Removing the protective coating exposes the mounting surface 31, 33. Once the seal base 18 is secured to the sidewall 12, the bulb seals 44 can be installed on each mounting side 35, 38.

The seal assembly may be easily adapted to fit to different slide-out room configurations by cutting to any necessary length. A variety of different corner configurations in the opening may be easily adapted by cutting the bulb seal 44 to a different length than the seal base 18, and the wiper 54 may be cut to a third length if necessary. A variety of different gaps between the mobile living quarter's sidewall and the slide-out room sidewalls may be easily adapted to by adjusting the lateral position of the seal base 18 relative the sidewall or trimming back the stop 60 or second stop 64. By mounting the seal base 18 and the bulb seal 44 to the wall 12, subsequent repair and replacement of worn bulb seals 44 may be easily performed without having to remove the slide out room 20 from the opening in wall 12.

After adhesive tape is optionally attached to the outer surface 50 and inner surface 52 of the side wall 12, the seal assembly 19 may be more securely attached to the corresponding inside and outside surfaces 52 and 50 by appropriate mechanical fasteners. Screws or nails may be driven through the mounting side 38 or mounting flange 36 into the side wall 12.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A resilient seal for mobile living quarters having main living area walls defining a main living area, an aperture in one of said main living area walls slidably receiving a slide out room having slide out room walls defining an auxiliary living space, said one main living area wall having an outside surface, an inside surface, and a transverse surface extending between said inside and outside surfaces, said transverse surface defining said aperture, said seal comprising:

a resilient seal base adapted to extend along said one main living area wall adjacent to said aperture, formed of a single member, having a first mounting portion engaging a first bulb seal, and having an oppositely located mounting surface being a substantially planar surface adapted for being secured to said main area living wall, said first mounting portion being collinear with a first spacing wall extending laterally from said first mounting portion, a second mounting portion engaging a second bulb seal, said second mounting portion being offset from a mounting flange, said mounting flange having a substantially planar surface adapted for being secured to said main area living wall, said mounting flange being nearer to said first mounting portion than said second mounting portion in a transverse direction, a second spacing wall being collinear with said second mounting portion and extending laterally therefrom;

said mounting flange adapted for being secured to said main living area wall and having a first terminal edge located relatively far from said second mounting portion and a second terminal edge located relatively near said second mounting portion, a separating wall extending from said second terminal edge to said second mounting portion to connect said mounting flange and said second mounting portion, said separating wall being substantially perpendicular to said second mounting portion and said mounting flange;

a bridge connecting said first and second spacing walls, said mounting flange is laterally farther from said bridge than said first and second mounting portions;

said seal base adapted to create a cavity between said main living area wall, said bridge, and said spacing walls;

a tongue and groove connector between one of said mounting portions and the respective bulb seal engaged therewith for releasably facilitating the connection therebetween; and said first mounting portion having a stop extending outwardly from said first mounting portion and adapted to contact said transverse surface in order to create the cavity.

2. The resilient seal of claim 1, said mounting portion overlaying a portion of said main living area wall adjacent to said transverse surface, said first and second spacing walls extending laterally beyond said transverse surface to space said bridge from said transverse surface.

3. The resilient seal of claim 2, said seal base having a second stop adapted to contact said transverse surface.

4. The resilient seal of claim 3, said seal base includes a wiper seal extending therefrom and adapted for engaging one of said slide out room walls.

5. The resilient seal of claim 4, said tongue and groove connector defined by outwardly facing tabs on said mounting portion and inwardly facing tabs on said bulb seal.

6. The resilient seal of claim 5, said bridge having ribs extending longitudinally.

7. A resilient seal for mobile living quarters having main living area walls defining a main living area, an aperture in one of said main living area walls slidably receiving a slide out room having slide out room walls defining an auxiliary living space, said one main living area wall having an outside surface, an inside surface, and a transverse surface extending between said inside and outside surfaces, said transverse surface defining said aperture, said seal comprising:

a resilient seal base adapted to extend along said one main living area wall adjacent to said aperture, formed of a single member, having a first mounting portion engaging a first bulb seal, and having an oppositely located mounting surface being adapted for being secured to said main area living wall, said first mounting portion being collinear with a first spacing wall extending laterally from said first mounting portion, a second mounting portion engaging a second bulb seal, said second mounting portion being offset from a mounting flange, said mounting flange adapted for being secured to said main area living wall, said mounting flange being nearer to said first mounting portion than said second mounting portion in a transverse direction, a second spacing wall being collinear with said second mounting portion and extending laterally therefrom;

said mounting flange adapted for being secured to said main living area wall, a separating wall extending from mounting flange to said second mounting portion to connect said mounting flange and said second mounting portion, said separating wall being substantially perpendicular to said second mounting portion and said mounting flange;

a bridge connecting said first and second spacing walls, said mounting flange is farther from said bridge than said first and second mounting portions;

said seal base adapted to create a cavity between said main living area wall, said bridge, and said spacing walls; and said first mounting portion having a stop extending outwardly from said first mounting portion and adapted to contact said transverse surface in order to create the cavity.

8. The resilient seal of claim 7, said mounting portion overlaying a portion of said main living area wall adjacent to said transverse surface and said first and second spacing walls extending laterally beyond said transverse surface to space said bridge from said transverse surface.

9. The resilient seal of claim 7, further comprising a tongue and groove connector between one of said mounting portions and the respective bulb seal engaged therewith for releasably facilitating the connection therebetween.

10. The resilient seal of claim 9, further comprising a tongue and groove connector between one of said mounting portions and the respective bulb seal engaged therewith for releasably facilitating the connection therebetween.

11. The resilient seal of claim 7, said seal base having a second stop adapted to contact said transverse surface.

12. The resilient seal of claim 11, said seal base includes a wiper seal extending therefrom and adapted for engaging one of said slide out room walls.

13. The resilient seal of claim 9, said tongue and groove connector defined by outwardly facing tabs on said mounting portion and inwardly facing tabs on said bulb seal.

14. A resilient seal for mobile living quarters having main living area walls defining a main living area, an aperture in one of said main living area walls slidably receiving a slide out room having slide out room walls defining an auxiliary living space, said one main living area wall having an outside surface, an inside surface, and a transverse surface extending between said inside and outside surfaces, said transverse surface defining said aperture, said seal comprising:

a resilient seal base adapted to extend along said one main living area wall adjacent to said aperture, having a first mounting portion adapted for engaging a first bulb seal, and having an oppositely located mounting surface being adapted for being secured to said main area living wall, a first spacing wall extending from said first mounting portion, a second mounting portion adapted for engaging a second bulb seal, said second mounting portion being offset from a mounting flange, said mounting flange adapted for being secured to said main area living wall, said mounting flange being nearer to said first mounting portion than said second mounting portion in a transverse direction, a second spacing wall extending laterally from said second mounting portion;

said mounting flange adapted for being secured to said main living area wall, a separating wall extending from said mounting flange to said second mounting portion to connect said mounting flange and said second mounting portion;

a bridge connecting said first and second spacing walls, said mounting flange is farther from said bridge than said first and second mounting portions; said seal base adapted to create a cavity between said main living area wall, said bridge, and said spacing walls; and said first mounting portion having a stop extending outwardly from said first mounting portion and adapted to contact said transverse surface in order to create the cavity.

15. The resilient seal of claim 14, said seal base includes a wiper seal extending therefrom and adapted for engaging one of said slide out room walls.

16. The resilient seal of claim 15, said mounting portions having outwardly facing tabs.

17. The resilient seal of claim 14, said bridge having ribs extending longitudinally.

18. The resilient seal of claim 14, said seal base having a second stop adapted to contact said transverse surface.

\* \* \* \* \*